(12) United States Patent
Sawada et al.

(10) Patent No.: US 9,919,312 B2
(45) Date of Patent: Mar. 20, 2018

(54) MANUFACTURING METHOD OF MICROFLUIDIC DEVICE

(71) Applicant: Fukoku Co., Ltd., Ageo-shi, Saitama (JP)

(72) Inventors: Makoto Sawada, Ageo (JP); Fumiaki Watanabe, Ageo (JP)

(73) Assignee: Fukoku Co., Ltd., Ageo-shi, Saitama (JP)

( * ) Notice: Subject to any disclaimer, the term of this patent is extended or adjusted under 35 U.S.C. 154(b) by 43 days.

(21) Appl. No.: 15/146,983

(22) Filed: May 5, 2016

(65) Prior Publication Data
US 2016/0325279 A1   Nov. 10, 2016

(30) Foreign Application Priority Data
May 8, 2015   (JP) ................ 2015-095608

(51) Int. Cl.
*B01L 3/00* (2006.01)
*C09D 183/04* (2006.01)
*C08G 77/12* (2006.01)
*C08G 77/16* (2006.01)
*C08G 77/20* (2006.01)

(52) U.S. Cl.
CPC ...... *B01L 3/502707* (2013.01); *C09D 183/04* (2013.01); *B01L 2300/0816* (2013.01); *B01L 2300/0887* (2013.01); *C08G 77/12* (2013.01); *C08G 77/16* (2013.01); *C08G 77/20* (2013.01)

(58) Field of Classification Search
CPC .................................. B01L 3/502707
See application file for complete search history.

(56) References Cited

U.S. PATENT DOCUMENTS

2002/0160139 A1* 10/2002 Huang ................ B01J 20/285
                                                              428/36.9
2014/0027054 A1    1/2014 Yoshihara et al.

FOREIGN PATENT DOCUMENTS

JP    2012-223858 A    11/2012
WO    2008/087800 A1    7/2008

* cited by examiner

*Primary Examiner* — Daniel H Lee
(74) *Attorney, Agent, or Firm* — McCormick, Paulding & Huber LLP

(57) ABSTRACT

The manufacturing method of a microfluidic device includes the steps of: preparing a first substrate which is obtained by curing silicone resin containing an unreacted part of a Si—H group and a platinum catalyst after being cured and has a flat first surface in which a concave groove or a through hole is partly provided and a second substrate which has a flat second surface in which a concave groove or a through hole is partly provided as necessary and has a hydroxyl group on a flat face of the second surface; and joining the first substrate and the second substrate by sticking the first surface of the first substrate and the second surface of the second substrate together.

14 Claims, 3 Drawing Sheets

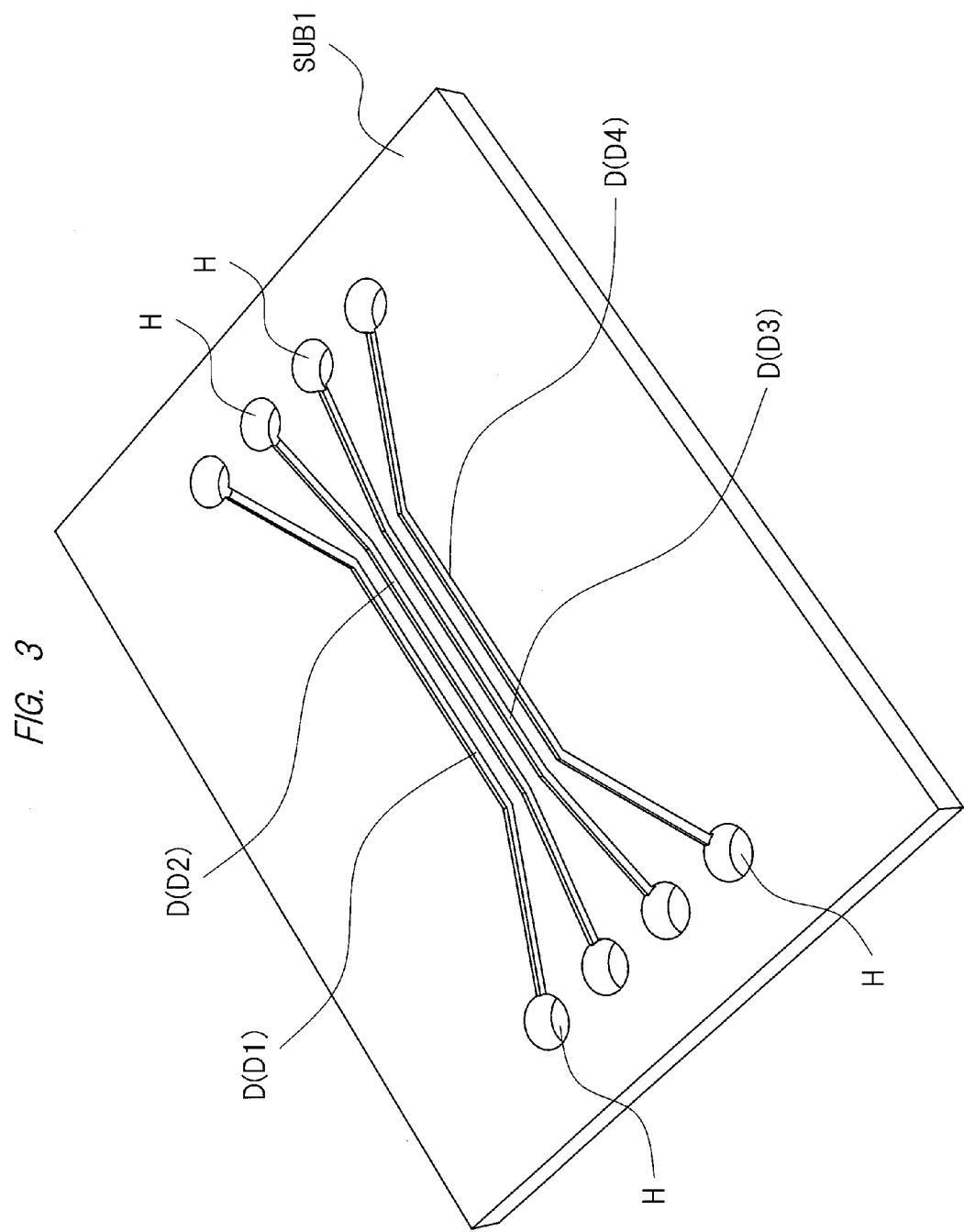

MANUFACTURING METHOD OF MICROFLUIDIC DEVICE

CROSS-REFERENCE TO RELATED APPLICATION

The present application claims priority from Japanese Patent Application No. 2015-095608 filed on May 8, 2015, the content of which is hereby incorporated by reference into this application.

TECHNICAL FIELD

The present invention relates to a manufacturing method of a microfluidic device obtained by sticking a plurality of substrates together.

BACKGROUND

The development of a microfluidic device, in which various kinds of fluids are analyzed and tested or reacted with each other by using fine flow channels in the scale of nanometers to micrometers, has been proceeding.

As a manufacturing method of such a microfluidic device, a method of fabricating it by sticking two substrates in which concave grooves for flow channels are formed in advance has been generally known.

In the technique disclosed in International Patent Publication WO2008/087800, respective joint surfaces of two resin substrates, at least one of which has a groove for a flow channel formed therein, are activated by plasma irradiation or ion beam irradiation, and then the substrates are joined together while applying pressure thereto.

In the technique disclosed in Japanese Patent Application Laid-Open Publication No. 2012-223858, after at least one of two substrates, at least one of which has a groove for a flow channel formed therein, is irradiated with ultraviolet light so as to activate a joint surface thereof, the substrates are joined together while applying pressure thereto, and the substrates are further heated after releasing the pressure.

SUMMARY

In the manufacture of a microfluidic device described above, it is important to join the substrates together while maintaining the fine flow channels formed in the substrates.

Generally, in a method of joining two plate materials together, after a liquid adhesive agent is applied to a joint surface of the plate material, the plate materials are joined and then dried and fixed. However, in the case of manufacturing the microfluidic device in which the fine flow channels are formed in the joint surfaces, an adhesive agent may flow into the fine flow channels when sticking the substrates together, so that the flow channels may be closed or dimensions of the flow channels may be changed due to the thickness of the adhesive agent, and it is difficult to control the quality of the microfluidic device.

Further, in the method in which the joint surfaces are irradiated with plasma or ion beam prior to the joining of the substrates (International Patent Publication WO2008/087800) and in the method in which the substrate is irradiated with ultraviolet light (Japanese Patent Application Laid-Open Publication No. 2012-223858), not only an expensive facility and energy but also a vacuum condition and the like are necessary, so that the increase in manufacturing cost is inevitable.

Moreover, in the methods of the International Patent Publication WO2008/087800 and the Japanese Patent Application Laid-Open Publication No. 2012-223858, pressure is applied to the substrates in the joining thereof. However, there is fear that such pressure application in the joining of the substrates may cause deformation of the flow channels and pattern precision of the flow channels may be deteriorated.

An object of the present invention is to provide a technique capable of manufacturing a high-quality microfluidic device without necessity of the expensive facility and energy.

The following is a brief description of an outline of the typical invention disclosed in the present application.

The manufacturing method of a microfluidic device according to the present invention includes the steps of: preparing a first substrate made of silicone resin, which contains an unreacted part of a Si—H group and a platinum catalyst after being cured and has a flat first surface in which a concave groove or a through hole is partly provided, and a second substrate which has a flat second surface in which a concave groove or a through hole is partly provided as necessary and has a hydroxyl group on a flat face of the second surface; and joining the first substrate and the second substrate by sticking the first surface of the first substrate and the second surface of the second substrate together.

Further, the manufacturing method of a microfluidic device according to the present invention includes the steps of: preparing a first substrate made of silicone resin, which contains an unreacted part of a Si-vinyl group and a platinum catalyst after being cured and has a flat first surface in which a concave groove or a through hole is partly provided, and a second substrate which has a flat second surface in which a concave groove or a through hole is partly provided as necessary and has a Si—H group on a flat face of the second surface; and joining the first substrate and the second substrate by sticking the first surface of the first substrate and the second surface of the second substrate together.

In addition, the manufacturing method of a microfluidic device according to the present invention further includes the step of heating the first substrate and the second substrate in a state where the first surface of the first substrate and the second surface of the second substrate are stuck together.

The effects obtained by typical embodiments of the invention disclosed in the present application will be briefly described below.

It is possible to manufacture a high-quality microfluidic device by mass production without necessity of any expensive facility or energy.

BRIEF DESCRIPTIONS OF THE DRAWINGS

FIG. 3 is a perspective view of a first substrate of the microfluidic device shown in FIG. 1.

DETAILED DESCRIPTION

Figure 1:
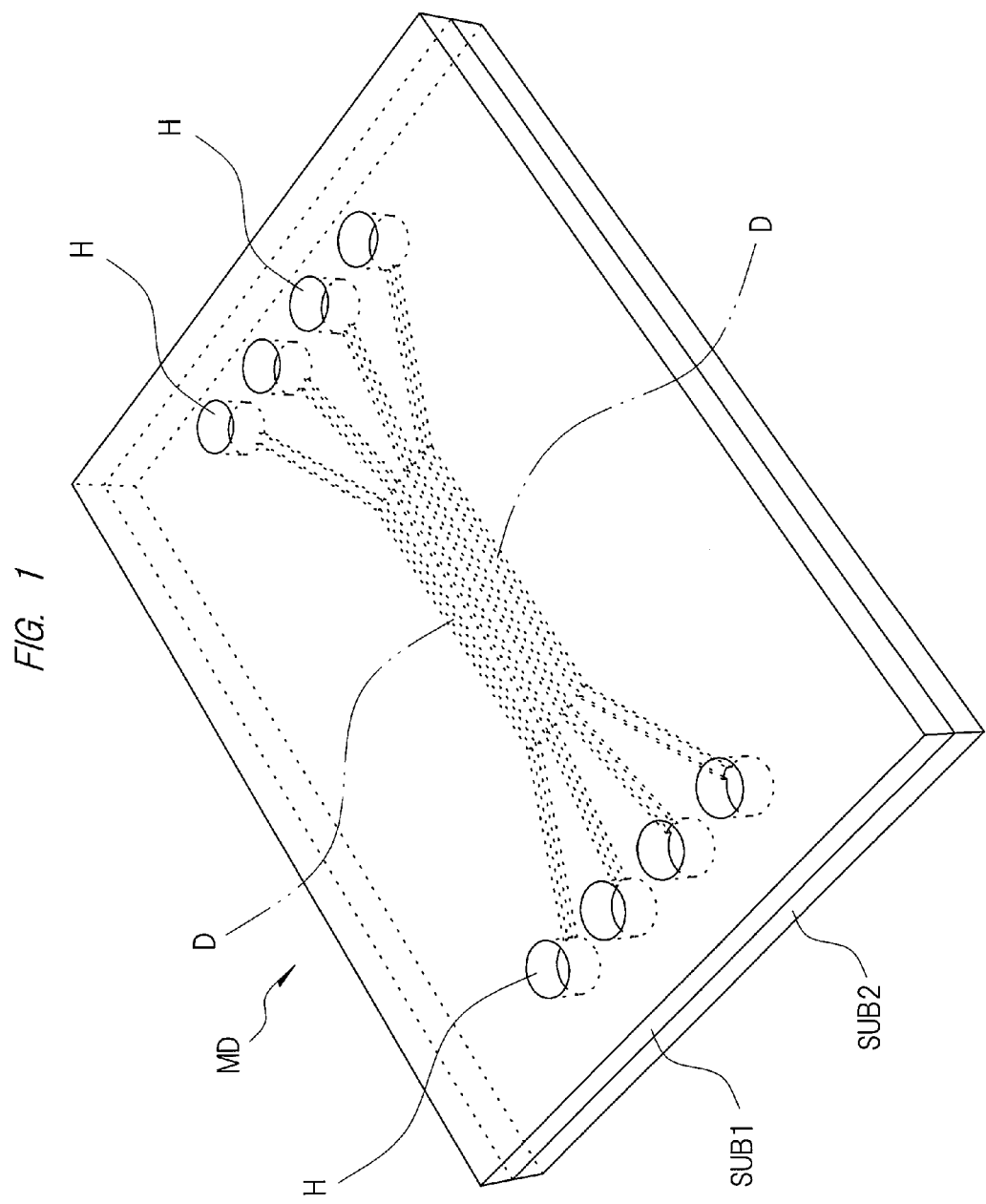
FIG. 1 is a perspective view of a microfluidic device according to an embodiment of the present invention.
Figure 2:
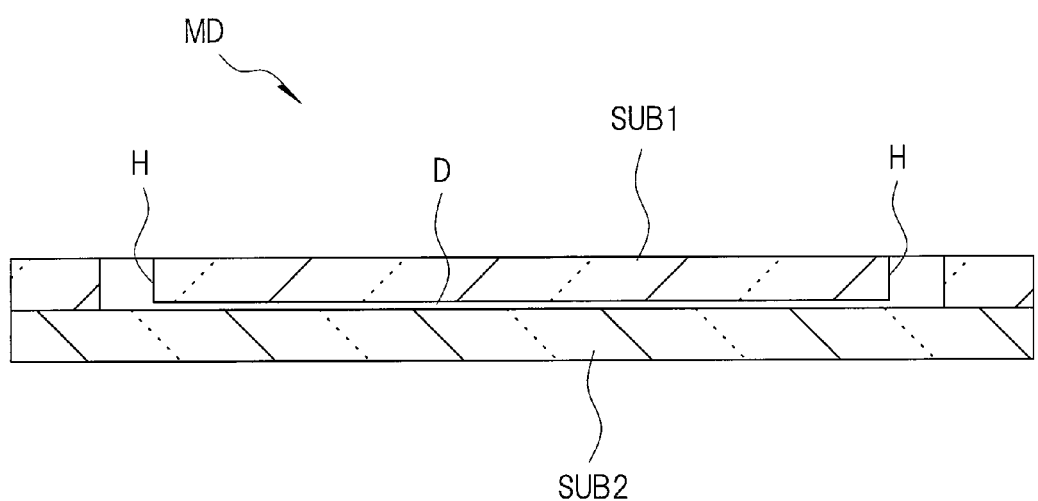
FIG. 2 is a cross-sectional view taken along a concave groove of the microfluidic device shown in FIG. 1.

Hereinafter, an embodiment of the present invention will be described in detail. FIG. 1 is a perspective view of a microfluidic device according to an embodiment of the present invention, FIG. 2 is a cross-sectional view taken along a concave groove of the microfluidic device shown in FIG. 1, and FIG. 3 is a perspective view of a first substrate of the microfluidic device shown in FIG. 1.

A microfluidic device MD is obtained by sticking a first substrate SUB1 made of transparent silicone resin which has a rectangular planar shape and a transparent second substrate SUB2 which has a rectangular planar shape.

Here, the first substrate SUB1 is made of silicone resin containing an unreacted part of a Si—H group and a platinum catalyst even after being cured, and a plurality of concave grooves D constituting flow channels are provided in a part of a flat joint surface (first surface) that faces the second substrate SUB2 and through holes H are arranged at both ends of the respective concave grooves D. Although an example in which four concave grooves D1 to D4 are formed in the first surface of the first substrate SUB1 as shown in FIG. 3 is illustrated here, the number of the concave grooves D and the shape thereof are not particularly limited, and can be changed variously according to the purposes.

Meanwhile, the second substrate SUB2 has a hydroxyl group on a flat joint surface (second surface) that faces the first substrate SUB1, and is typically made of a glass material, but is not limited thereto.

In the example shown in the figures, dimensions of the second substrate SUB2 are equal to dimensions of the first substrate SUB1, but the dimensions of the second substrate SUB2 may be larger than the dimensions of the first substrate SUB1. Further, in the example shown in the figures, the entire second surface of the second substrate SUB2 is flat, but the second surface may have a concave groove or a through hole formed in a part thereof.

The first substrate SUB1 and the second substrate SUB2 with the above-described compositions have properties that, when the first substrate SUB1 is stacked on the second substrate SUB2 so that the first surface of the first substrate SUB1 faces the second surface of the second substrate SUB2, a Si—H group of the first substrate SUB1 and a hydroxyl group of the second substrate SUB2 are bonded with each other via a platinum catalyst, whereby their joint surfaces are joined firmly. Namely, the first substrate SUB1 and the second substrate SUB2 are joined firmly only by the adhesive force of the substrates even when their joint surfaces are not subjected to the surface treatment to apply energy such as plasma, ion beams and ultraviolet light, the pressure application or the vacuum treatment.

The adhesion between the substrates by the bonding between the Si—H group of the first substrate SUB1 and the hydroxyl group of the second substrate SUB2 can proceed even in a room temperature, but if heat treatment is applied to the substrates in a state of being stuck together, the adhesion proceeds more rapidly, and so it is desirable that the heat treatment is applied to the substrates in the case of mass production.

Next, compositions of base materials that constitute the first substrate SUB1 and the second substrate SUB2 and a method of joining them will be described below further in detail.

The first substrate SUB1 is preferably obtained by thermally curing a silicone resin composite which contains:

(A)

organopolysiloxane which is made of one kind of copolymer including two or more kinds of units among below-listed "a" to "d" or a mixture of plural kinds of copolymer including two or more kinds of units among "a" to "d", has at least one alkenyl group in one molecule, and has viscosity of 100 mPa·s to 1,000,000 mPa·s, a: $R^1SiO_{1.5}$ unit (here, $R^1$ denotes a C1-C10 straight-chain, branched or cyclic alkyl group or a C6-C10 aryl group),
b: $R^2SiO$ unit (here, $R^2$ denotes a C1-C10 straight-chain, branched or cyclic alkyl group or a C2-C8 alkenyl group),
c: $R^3SiO_{0.5}$ unit (here, $R^3$ is $R^1$ or $R^2$) and
d: $SiO_{2.0}$ unit;

(B)

organohydrogen polysiloxane which is made of one kind of copolymer including two or more kinds of units among below-listed "a", "b", "d" and "e" or a mixture of plural kinds of copolymer including two or more kinds of units among "a", "b", "d" and "e", has at least three Si—H groups in one molecule, and has viscosity of 5 mPa·s to 1,000 mPa·s, a: $R^1SiO_{1.5}$ unit,
b: $R^2SiO$ unit,
d: $SiO_{2.0}$ unit and
e: $R^1{}_xH_ySiO_{(4-x-y)/2}$ unit (here, $R^1$ is as described above, x is 0, 1 or 2, y is 1 or 2, and x+y is 2 or 3); and (C)

a platinum catalyst, in an amount being set as a curing effective amount at which H atoms bonded to Si atoms in the component (B) have a molar ratio of 3.0 to 30.0 with respect to a total of alkenyl groups in the component (A).

More preferably, the component (B) is a mixture of:

(B-1)

organohydrogen polysiloxane which is made of copolymer of units represented by "a", "b", "d" and "e" below, has at least three Si—H groups in one molecule, and has viscosity of 5 mPa·s to 100 mPa·s, a: $R^1SiO_{1.5}$ unit,
b: $R^2SiO$ unit,
d: $SiO_{2.0}$ unit and
e: $R^1{}_xH_ySiO_{(4-x-y)/2}$ unit (here, $R^1$ is as described above, x is 0, 1 or 2, y is 1 or 2, and x+y is 2 or 3); and (B-2)

organohydrogen polysiloxane which is made of copolymer of units represented by "d" and "e" below, has at least three Si—H groups in one molecule, and has viscosity of 5 mPa·s to 100 mPa·s, d: $SiO_{2.0}$ unit and
e: $R^1{}_2H_ySiO_{0.5}$ unit (here, $R^1$ is as described above).

In addition, the component (B) may be a mixture of:

(B-1)

organohydrogen polysiloxane which is made of copolymer of units represented by "a", "b", "d" and "e" below, has at least three Si—H groups in one molecule, and has viscosity of 5 mPa·s to 100 mPa·s, a: $R^1SiO_{1.5}$ unit,
b: $R^2SiO$ unit,
d: $SiO_{2.0}$ unit and
e: $R^1{}_xH_ySiO_{(4-x-y)/2}$ unit (here, $R^1$ is as described above, x is 0, 1 or 2, y is 1 or 2, and x+y is 2 or 3); and (B-2)

organohydrogen polysiloxane which is made of copolymer of units represented by "d" and "e" below, has at least three Si—H groups in one molecule, and has viscosity of 5 mPa·s to 100 mPa·s, d: $SiO_{2.0}$ unit and
e: $R^1{}_2H/SiO_{0.5}$ unit (here, $R^1$ is as described above). Here, the Si—H group at the terminal end of the organohydrogen polysiloxane and the Si—H group in the main chain thereof are mixed for use.

Further, the first substrate SUB1 may be obtained by curing a silicone resin composite which contains:

(A)

organopolysiloxane which is made of one kind of copolymer including two or more kinds of units among below-listed "a" to "d" or a mixture of plural kinds of copolymer including two or more kinds of units among "a" to "d", has at least one alkenyl group in one molecule, and has viscosity of 100 mPa·s to 1,000,000 mPa·s, a: $R^1SiO_{1.5}$ unit (here, $R^1$ denotes a C1-C10 straight-chain, branched or cyclic alkyl group or a C6-C10 aryl group), b: $R^2SiO$ unit (here, $R^2$ denotes a C1-C10 straight-chain, branched or cyclic alkyl group or a C2-C8 alkenyl group), c: $R^3SiO_{0.5}$ unit (here, $R^3$ is $R^1$ or $R^2$) and d: $SiO_{2.0}$ unit;

(B)

organohydrogen polysiloxane which is made of one kind of copolymer including two or more kinds of units among below-listed "a", "b", "d" and "e" or a mixture of plural kinds of copolymer including two or more kinds of units among "a", "b", "d" and "e", has at least three Si—H groups in one molecule, and has viscosity of 5 mPa·s to 1,000 mPa·s, a: $R^1SiO_{1.5}$ unit, b: $R^2SiO$ unit, d: $SiO_{2.0}$ unit and e: $R^1_xH_ySiO_{(4-x-y)/2}$ unit (here, $R^1$ is as described above, x is 0, 1 or 2, y is 1 or 2, and x+y is 2 or 3); and (C)

a platinum catalyst, and in which H atoms bonded to Si atoms in the component (B) have a molar ratio of 0.3 to 30.0 with respect to a total of alkenyl groups in the component (A), while stopping the curing at the time when a vulcanization degree measured by CURELASTOMETER (trade name, produced by JSR Trading Co., Ltd., testing machinery for curing characteristics of rubber and hardening characteristics of thermosetting resin) reaches a range from 10% to 90%.

In this case, a ratio between hydrogen and vinyl groups in the polymer during blending is within a range of usual silicone resin, but by adjusting a heating temperature and a heating time in the curing, the reaction is stopped halfway to leave the hydrogen, and heat treatment is performed after joining the substrates together to complete the adhesion and the curing, whereby the higher adhesiveness can be obtained.

It is preferable that the second substrate SUB2 is obtained by surface treatment to react the hydroxyl group of the second surface with a composite having a Si-vinyl group. More specifically, the second substrate SUB2 is preferably obtained by applying tetramethyldivinyldisilazane to the joint surface (second surface) of the second substrate SUB2 and subsequently carrying out the surface treatment by heating at 100° C. to 250° C., or by applying a silane coupling agent that contains an alkenyl group and an alkoxy group in one molecule to the joint surface of the second substrate SUB2 and subsequently carrying out the surface treatment by heating at 100° C. to 250° C.

In this surface treatment, it is important to make a layer as thin as possible for obtaining the smooth surface, in order to prevent the influence on the fine flow channels and prevent air bubbles from being contained in the joint surface. In the case of using vinyl trialkoxysilane, it is preferable to dilute it with volatile solvent such as alcohol before the application. In this case, a surface treatment layer which has a sufficiently small thickness with respect to the flow channels that have groove widths and/or groove depths of about 0.1 μm to several millimeters can be formed. It is tetramethyldivinyldisilazane whose reactive site can be bonded with a hydroxyl group on the substrate surface as one dimethylvinylsiloxy group after the surface treatment that can carry out more preferable surface treatment.

Also, silicone resin containing an unreacted part of a Si-vinyl group and a platinum catalyst even after being cured may be used as the first substrate SUB1, and a substrate having a Si—H group on the joint surface (second surface) may be used as the second substrate SUB2.

In this case, when stacking the first substrate SUB1 and the second substrate SUB2 so that the first surface of the first substrate SUB1 faces the second surface of the second substrate SUB2, the Si-vinyl group of the first substrate SUB1 is bonded with the Si—H group of the second substrate SUB2 via the platinum catalyst, so that the joint surfaces of the substrates can be joined firmly with each other. Namely, the first substrate SUB1 and the second substrate SUB2 can be joined firmly only by the adhesive force of the substrates even when their joint surfaces are not subjected to the surface treatment to apply energy such as plasma, ion beams and ultraviolet light, the pressure application or the vacuum treatment.

The adhesion between the substrates by the bonding between the Si-vinyl group of the first substrate SUB1 and the Si—H group of the second substrate SUB2 can proceed even in a room temperature, but if heat treatment is applied to the substrates in a state of being stuck together, the adhesion proceeds more rapidly, and so it is desirable that the heat treatment is applied to the substrates in the case of mass production.

In this case, the first substrate SUB1 is preferably obtained by thermally curing a silicone resin composite which contains:

(A)

organopolysiloxane which is made of one kind of copolymer including two or more kinds of units among below-listed "a" to "d" or a mixture of plural kinds of copolymer including two or more kinds of units among "a" to "d", has at least one alkenyl group in one molecule, and has viscosity of 100 mPa·s to 1,000,000 mPa·s, a: $R^1SiO_{1.5}$ unit (here, $R^1$ denotes a C1-C10 straight-chain, branched or cyclic alkyl group or a C6-C10 aryl group), b: $R^2SiO$ unit (here, $R^2$ denotes a C1-C10 straight-chain, branched or cyclic alkyl group or a C2-C8 alkenyl group), c: $R^3SiO_{0.5}$ unit (here, $R^3$ is $R^1$ or $R^2$) and d: $SiO_{2.0}$ unit;

(B)

organohydrogen polysiloxane which is made of copolymer of units represented by "a", "b", "d" and "e" below, has at least three Si—H groups in one molecule, and has viscosity of 5 mPa·s to 100 mPa·s, a: $R^1SiO_{1.5}$ unit, b: $R^2SiO$ unit, d: $SiO_{2.0}$ unit and e: $R^1_xH_ySiO_{(4-x-y)/2}$ unit (here, $R^1$ is as described above, x is 0, 1 or 2, y is 1 or 2, and x+y is 2 or 3); and (C)

a platinum catalyst, in an amount being set as a curing effective amount at which H atoms bonded to Si atoms in the component (B) have a molar ratio of 0.2 to 1.0 with respect to a total of alkenyl groups in the component (A), and the second substrate SUB2 is preferably obtained by: applying organohydrogen polysiloxane, which is made of copolymer including one kind of a unit among below-listed "b" and "e" or a mixture of plural kinds of copolymer including two kinds of the units of "b" and "e", has at least three Si—H groups in one molecule, and has viscosity of 5 mPa·s to 1,000 mPa·s, to the second surface; and subsequently performing heat treatment thereto at 100° C. to 200° C., b: $R^2SiO$ unit and e: $R^1{}_xH_ySiO_{(4-x-y)/2}$ unit (here, $R^1$ is as described above, x is 0, 1 or 2, y is 1 or 2, and x+y is 2 or 3).

More preferably, the above-described second substrate SUB2 is obtained by: applying organohydrogen polysiloxane, which is made of copolymer of units represented by "d" and "e" below, has at least three Si—H groups in one molecule, and has viscosity of 5 mPa·s to 100 mPa·s, to the second surface; and subsequently performing heat treatment thereto at 100° C. to 200° C., d: $SiO_{2.0}$ unit and e: $R^1{}_2H/SiO_{0.5}$ unit (here, $R^1$ is as described above), alternatively, the second substrate SUB2 is obtained by: applying silane which has an alkoxy group and a Si—H group in one molecule or chain or cyclic siloxane represented by a following general formula (1) to the second surface; and subsequently performing heat treatment thereto at 100° C. to 200° C.

[Chemical Formula 1]

$$\begin{array}{c} R^1 \\ | \\ -\!\!\left(\!\!Si\!\!-\!\!O\!\!\right)_{\!a}\!\!\!\! \\ | \\ CH_3 \end{array} \begin{array}{c} CH_3 \\ | \\ \left(\!\!Si\!\!-\!\!O\!\!\right)_{\!b}\!\!\!\! \\ | \\ CH_2\!\!-\!\!HCR^2\!\!-\!\!C\!\!-\!\!O\!\!-\!\!\left(\!CH_2\!\right)_{\!n}\!\!Si\!\!-\!\!\left(OR^3\right)_3 \\ \| \\ O \end{array} \quad (1)$$

(In the formula, R1, R2 and R3 respectively denote C1-C6 univalent hydrocarbon groups and/or hydrogen atoms, "a" denotes an integer from 1 to 10, "b" denotes an integer from 1 to 100, and "n" denotes an integer from 1 to 4.)

Also in this surface treatment, it is important to make a layer as thin as possible for obtaining the smooth surface, in order to prevent the influence on the fine flow channels and prevent air bubbles from being contained in the joint surface. Thus, the organohydrogen polysiloxane or the silane which has the alkoxy group and the Si—H group in one molecule as a surface treating agent is preferably diluted with organic solvent such as hexane and alcohol before the application. In this case, the surface treatment layer which has a sufficiently small thickness with respect to the flow channels that have the groove widths and/or the groove depths of about 0.1 μm to several millimeters can be formed.

EXAMPLE

<1. Fabrication of First Substrate>

The first substrate shown in FIG. 1 was fabricated by a method described below. Sizes of respective parts of the first substrate were as follows:

Total length (in longer-side direction): 30 mm
Total width (in shorter-side direction): 40 mm
Thickness: 2 mm
Depth of concave groove D1: 50 μm
Depth of concave groove D2: 50 μm
Depth of concave groove D3: 50 μm
Depth of concave groove D4: 50 μm
Width of concave groove D1: 100 μm
Width of concave groove D2: 100 μm
Width of concave groove D3: 100 μm
Width of concave groove D4: 100 μm
Interval between concave groove D1 and concave groove D2 in measurement unit: 50 μm
Interval between concave groove D2 and concave groove D3 in measurement unit: 50 μm
Interval between concave groove D3 and concave groove D4 in measurement unit: 50 μm
Length of measurement unit: 10 mm
Diameter of through hole (introduction port): 0.75 mm
Length of introduction flow channel: 5 mm
Width of introduction flow channel: 0.1 mm (1-1) Fabrication of Molding Die 1) A silicon wafer (3 inches, produced by Ferrotec Corporation.) was spin-coated with a coating agent (trade name: OmniCoat™, produced by MicroChem Corp.) at 4000 rpm for 10 seconds, and was then baked at 180° C. for 1 minute.

2) The wafer was spin-coated with photoresist (trade name: SU8-25, produced by MicroChem Corp.) at 2000 rpm for 30 seconds. A film thickness was about 16 to 17 μm.

3) The photoresist was pre-baked at 65° C. for 3 minutes and at 95° C. for 7 minutes. Further, the above steps 2) and 3) were repeated so as to obtain the thickness of 50 μm.

4) The photoresist was exposed to light with a micropattern by using a mask aligner (trade name: ES20, produced by Nanometric Technology Inc.) for 11 seconds.

5) After the exposure, the silicon wafer was baked at 65° C. for 1 minute and at 95° C. for 3 minutes.

6) The silicon wafer was developed by SU8-Developer (trade name, produced by MicroChem Corp.) for 2 minutes.

7) The silicon wafer was hard-baked at 180° C. for 30 minutes so as to be baked firmly.

8) For mold releasing of silicone resin, the silicon wafer was spin-coated with CYTOP 809-ME (trade name, produced by AGC Chemicals Company) of 0.84 wt % at 4000 rpm, and was treated at 180° C. for one hour.

9) A molding frame made of glass was formed to have a size of: a length of 30 mm; a width of 40 mm; and a height of 2 mm, and the above-described molding die was set therein.

(1-2) Molding of First Substrate

Composites listed in Tables 1 and 2 were defoamed by vacuum, were subsequently poured into the molding die fabricated in (1-1), and were cured at 100° C. for 30 minutes and then taken out, thereby obtaining the first substrate made of the silicone resin.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Base material 1 | Kind of silicone resin base material composite | A | A | B | C | D | A | A | A | A |
| | Molar ratio of H in crosslinking agent with respect to amount of | 5 | 20 | 5 | 5 | 10 | 1.5 | 5 | 5 | 5 |

TABLE 1-continued

| | | Example | | | | | | | | |
|---|---|---|---|---|---|---|---|---|---|---|
| | | 1 | 2 | 3 | 4 | 5 | 6 | 7 | 8 | 9 |
| | vinyl group in base material (H/vinyl) | | | | | | | | | |
| | Curing temperature of silicone resin composite (° C.) | 100 | 100 | 100 | 100 | 100 | 80 | 80 | 100 | 100 |
| | Curing time of silicone resin composite (min.) | 30 | 30 | 30 | 30 | 30 | 10 | 10 | 30 | 30 |
| | Vulcanization degree under condition of taking out from die | 100 | 100 | 100 | 100 | 100 | 40 | 60 | 100 | 100 |
| Base material 2 | Material of Base material 2 | Glass | Glass | Glass | Glass | Glass | Glass | Glass | Glass | Glass |
| | Surface treatment of Base material 2 [1] | None | None | None | None | None | None | None | None | Treatment 1 |
| Condition of sticking Base materials 1 and 2 together | Temperature (° C.) | 150 | 150 | 150 | 150 | 150 | 150 | 150 | 100 | 100 |
| | Time (min.) | 30 | 30 | 30 | 30 | 30 | 30 | 30 | 20 | 20 |
| Evaluation result | Leakage of colored water | None | None | None | None | None | None | None | None | None |
| | Pressure reduction of leakage tester (Pa) | −7 | −6 | −7 | −8 | −6 | −7 | −7 | −20 | −9 |
| | Eyeleteer test (peeled/rubber remained/completely adhered) | completely adhered | completely adhered | completely adhered | completely adhered | completely adhered | completely adhered | completely adhered | rubber remained | completely adhered |

[1] Surface treatment of Base material 2
Treatment 1: Spraying divinyltetramethyldisilazane onto a surface of washed glass; drying at a room temperature for one hour; and then heat-drying at a temperature of 150° C. for 10 minutes.
Treatment 2: Spraying 10 wt % methacryloxypropyltrimethoxysilane diluted with methanol onto a surface of washed glass; drying at a room temperature for one hour; and then heat-drying at a temperature of 150° C. for 30 minutes.
Treatment 3: Applying Crosslinking agent 2 in Table 2 onto a surface of washed glass; and then heating at a temperature of 150° C. for 60 minutes.
Treatment 4: Applying Crosslinking agent 3 in Table 2 onto a surface of washed glass; and then heating at a temperature of 150° C. for 60 minutes.
Treatment 5: Applying the compound represented by Formula (1) onto a surface of washed glass; and then heating at a temperature of 150° C. for 60 minutes.

TABLE 2

| | | Example (continued) | | | | | | Comparative Example | | | |
|---|---|---|---|---|---|---|---|---|---|---|---|
| | | 10 | 11 | 12 | 13 | 14 | 15 | 1 | 2 | 3 | 4 |
| Base material 1 | Kind of silicone resin base material composite | A | A | A | A | A | A | A | A | A | A |
| | Molar ratio of H in crosslinking agent with respect to amount of vinyl group in base material (H/vinyl) | 5 | 0.7 | 0.7 | 1.5 | 1.5 | 0.7 | 1.5 | 5 | 0.7 | 0.7 |
| | Curing temperature of silicone resin composite (° C.) | 100 | 100 | 100 | 80 | 80 | 100 | 100 | 100 | 100 | 100 |
| | Curing time of silicone resin composite (min.) | 30 | 30 | 30 | 10 | 10 | 30 | 30 | 30 | 30 | 30 |
| | Vulcanization degree under condition of taking out from die | 100 | 100 | 100 | 40 | 40 | 100 | 100 | 100 | 100 | 100 |
| Base material 2 | Material of Base material 2 | Glass | Glass | Glass | Glass | Glass | Base material 1 in Example 1 | Glass | Glass | Glass | Glass |
| | Surface treatment of Base material 2 [1] | Treatment 2 | Treatment 3 | Treatment 4 | Treatment 4 | Treatment 5 | Treatment 5 | None | None | None | Treatment 1 |
| Condition of sticking Base materials 1 and 2 together | Temperature (° C.) | 100 | 100 | 100 | 100 | 100 | 100 | 150 | Room temperature | 150 | 150 |
| | Time (min.) | 20 | 20 | 20 | 20 | 20 | 20 | 30 | 30 | 30 | 30 |
| Evaluation result | Leakage of colored water | None | None | None | None | None | None | Leaked | Leaked | Leaked | Leaked |
| | Pressure reduction of leakage tester (Pa) | −7 | −7 | −9 | −6 | −7 | −7 | −125 | −130 | −135 | −135 |

TABLE 2-continued

|  | Example (continued) | | | | | | Comparative Example | | | |
| --- | --- | --- | --- | --- | --- | --- | --- | --- | --- | --- |
|  | 10 | 11 | 12 | 13 | 14 | 15 | 1 | 2 | 3 | 4 |
| Eyeleteer test (peeled/rubber remained/completely adhered) | completely adhered | completely adhered | completely adhered | completely adhered | completely adhered | completely adhered | peeled | peeled | peeled | peeled |

[1] Surface treatment of Base material 2
Treatment 1: Spraying divinyltetramethyldisilazane onto a surface of washed glass; drying at a room temperature for one hour; and then heat-drying at a temperature of 150° C. for 10 minutes.
Treatment 2: Spraying 10 wt % methacryloxypropyltrimethoxysilane diluted with methanol onto a surface of washed glass; drying at a room temperature for one hour; and then heat-drying at a temperature of 150° C. for 30 minutes.
Treatment 3: Applying Crosslinking agent 2 in Table 2 onto a surface of washed glass; and then heating at a temperature of 150° C. for 60 minutes.
Treatment 4: Applying Crosslinking agent 3 in Table 2 onto a surface of washed glass; and then heating at a temperature of 150° C. for 60 minutes.
Treatment 5: Applying the compound represented by Formula (1) onto a surface of washed glass; and then heating at a temperature of 150° C. for 60 minutes.

<2. Preparation of Second Substrate>

The second substrate described in Table 3 was cut to have a size of: a length of 30 mm; a width of 40 mm; and a thickness of 1 mm, was washed with organic solvent and then washed with pure water, and was subsequently dried at 120° C. for 10 minutes.

TABLE 3

|  |  | Silicon resin base material composite | | | |
| --- | --- | --- | --- | --- | --- |
|  |  | A | B | C | D |
| Base polymer | Organopolysiloxane that is a mixture with viscosity of 5,000 mPa · s, containing: 90 wt % of dimethylpolysiloxane whose both terminal ends are blocked by dimethylvinylsiloxy groups and which has an average polymerization degree of 750; and 10 wt % of resin copolymer which is made of a unit of $(CH_3)_3SiO_{1/2}$, a unit of $CH_2 = CH(CH_3)_2SiO_{1/2}$ and a unit of $SiO_2$ | 100 | 100 | 100 | 100 |
| Crosslinking agent 1 | Straight-chain methylhydrogen polysiloxane which has Si—H groups at both terminal ends and a side chain, in which remaining organic groups are $CH_3$ groups, and which has viscosity of 20 mPa · s and a Si—H group amount of 0.006 mol/g | Required amount | 0 | 0 | Required amount |
| Crosslinking agent 2 | Straight-chain methylhydrogen polysiloxane which has Si—H groups at both terminal ends and a side chain, in which remaining organic groups are $CH_3$ groups, and which has viscosity of 10 mPa · s and a Si—H group amount of 0.015 mol/g | 0 | Required amount | 0 | 0 |
| Crosslinking agent 3 | Methylhydrogen polysiloxane which is made of $(CH_3)_2HSi$ group and $SiO_2$, and has viscosity of 10 mPa · s and a Si—H group amount of 0.008 mol/g | 0 | 0 | Required amount | Required amount (equal to the amount of Crosslinking agent 1 as H amount) |
| Curing catalyst | Platinum catalyst (concentration of Pt: 1 mass %) | 0.1 | 0.1 | 0.1 | 0.1 |
| Reaction control agent | Ethynylcyclohexanol | 0.05 | 0.05 | 0.05 | 0.05 |

<3. Sticking of First Substrate and Second Substrate Together>

Since the first substrate and the second substrate have strong adhesive force for each other, they are likely to incorporate air while being stuck together. Then, if the first substrate and the second substrate get contact with each other gradually in one direction from one end, they can be stuck without incorporating air. The first substrate and the second substrate, which were adhered with each other in this manner, were treated by heat under the temperature and time conditions listed in Table 1, and thereafter, they were cooled naturally to complete the adhesion, thereby obtaining the microfluidic device constituted of the first substrate and the second substrate as illustrated in FIG. 1.

<4. Evaluation>

(4-1)

Tap water colored with ink was flown through each of the introduction flow channels that were formed in the microfluidic device, thereby checking whether the water was leaked out to the other introduction flow channels or not.

(4-2)

One of the introduction ports of each introduction flow channel was closed, and pressure of 10 kPa was applied to the other introduction port by using a leakage tester. After maintaining this pressure application for 5 seconds, pressure change was measured, and leakage of the colored water from each introduction flow channel was checked.

(4-3)

The substrates were pierced with an eyeleteer at their adhesive interfaces, and a peeled state of the interfaces was observed. Evaluation was based on the following three criteria: (1) the substrates were peeled at their interfaces; (2) a part of the silicone resin was remained; and (3) the silicone resin was completely adhered.

Results of the respective evaluations of (4-1), (4-2) and (4-3) are shown in Table 1 and Table 2. From the above-stated results, it can be verified that the first substrate and the second substrate in the microfluidic device of the present example were adhered firmly.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A manufacturing method of a microfluidic device comprising the steps of:
preparing a first substrate which is made of silicone resin containing an unreacted part of a Si—H group and a platinum catalyst after being cured and has a flat first surface in which a concave groove or a through hole is provided, and a second substrate which has a flat second surface in which a concave groove or a through hole is optionally provided and has a hydroxyl group on a flat face of the second surface; and
joining the first substrate and the second substrate by sticking the first surface of the first substrate and the second surface of the second substrate together.

2. The manufacturing method of a microfluidic device according to claim 1,
wherein the first substrate and the second substrate are heated in a state where the first surface of the first substrate and the second surface of the second substrate are stuck together.

3. The manufacturing method of a microfluidic device according to claim 1,
wherein the first substrate is obtained by thermally curing a silicone resin composite which contains:
(A)
organopolysiloxane which is made of one kind of copolymer including two or more kinds of units among below-listed "a" to "d" or a mixture of plural kinds of copolymer including two or more kinds of units among "a" to "d", has at least one alkenyl group in one molecule, and has viscosity of 100 mPa·s to 1,000,000 mPa·s,
a: $R^1SiO_{1.5}$ unit (here, $R^1$ denotes a C1-C10 straight-chain, branched or cyclic alkyl group or a C6-C10 aryl group),
b: $R^2SiO$ unit (here, $R^2$ denotes a C1-C10 straight-chain, branched or cyclic alkyl group or a C2-C8 alkenyl group),
c: $R^3SiO_{0.5}$ unit (here, $R^3$ is $R^1$ or $R^2$) and
d: $SiO_{2.0}$ unit;
(B)
organohydrogen polysiloxane which is made of one kind of copolymer including two or more kinds of units among below-listed "a", "b", "d" and "e" or a mixture of plural kinds of copolymer including two or more kinds of units among "a", "b", "d" and "e", has at least three Si—H groups in one molecule, and has viscosity of 5 mPa·s to 1,000 mPa·s,
a: $R^1SiO_{1.5}$ unit,
b: $R^2SiO$ unit,
d: $SiO_{2.0}$ unit and
e: $R^1_xH_ySiO_{(4-x-y)/2}$ unit (here, $R^1$ is as described above, x is 0, 1 or 2, y is 1 or 2, and x+y is 2 or 3); and
(C)
a platinum catalyst,
wherein the silicone resin composite contains an effective curing amount of H atoms bonded to Si atoms in the component (B) having a molar ratio of 3.0 to 30.0 with respect to a total of alkenyl groups in the component (A).

4. The manufacturing method of a microfluidic device according to claim 3,
wherein the component (B) is a mixture of:
(B-1)
organohydrogen polysiloxane which is made of copolymer of units represented by "a", "b", "d" and "e" below, has at least three Si—H groups in one molecule, and has viscosity of 5 mPa·s to 100 mPa·s,
a: $R^1SiO_{1.5}$ unit,
b: $R^2SiO$ unit,
d: $SiO_{2.0}$ unit and
e: $R^1_xH_ySiO_{(4-x-y)/2}$ unit (here, $R^1$ is as described above, x is 0, 1 or 2, y is 1 or 2, and x+y is 2 or 3); and
(B-2)
organohydrogen polysiloxane which is made of copolymer of units represented by "d" and "e" below, has at least three Si—H groups in one molecule, and has viscosity of 5 mPa·s to 100 mPa·s,
d: $SiO_{2.0}$ unit and
e: $R^1_2HSiO_{0.5}$ unit (here, $R^1$ is as described above).

5. The manufacturing method of a microfluidic device according to claim 1,
wherein the first substrate is obtained by curing a silicone resin composite which contains:
(A)
organopolysiloxane which is made of one kind of copolymer including two or more kinds of units among below-listed "a" to "d" or a mixture of plural kinds of copolymer including two or more kinds of units among "a" to "d", has at least one alkenyl group in one molecule, and has viscosity of 100 mPa·s to 1,000,000 mPa·s,
a: $R^1SiO_{1.5}$ unit (here, $R^1$ denotes a C1-C10 straight-chain, branched or cyclic alkyl group or a C6-C10 aryl group),
b: $R^2SiO$ unit (here, $R^2$ denotes a C1-C10 straight-chain, branched or cyclic alkyl group or a C2-C8 alkenyl group),
c: $R^3SiO_{0.5}$ unit (here, $R^3$ is $R^1$ or $R^2$) and
d: $SiO_{2.0}$ unit;
(B)
organohydrogen polysiloxane which is made of one kind of copolymer including two or more kinds of units among below-listed "a", "b", "d" and "e" or a mixture of plural kinds of copolymer including two or more kinds of units among "a", "b", "d" and "e", has at least three Si—H groups in one molecule, and has viscosity of 5 mPa·s to 1,000 mPa·s,
a: $R^1SiO_{1.5}$ unit,
b: $R^2SiO$ unit,
d: $SiO_{2.0}$ unit and
e: $R^1_xH_ySiO_{(4-x-y)/2}$ unit (here, $R^1$ is as described above, x is 0, 1 or 2, y is 1 or 2, and x+y is 2 or 3); and
(C)
a platinum catalyst,
and in which H atoms bonded to Si atoms in the component (B) have a molar ratio of 0.3 to 30.0 with respect to a total of alkenyl groups in the component (A), while stopping the curing at the time when a vulcanization degree measured by curelastometer reaches a range from 10% to 90%, and
the first substrate and the second substrate are optionally heated in a state where the first substrate and the second substrate are stacked so that the first surface of the first substrate faces the second surface of the second substrate.

6. The manufacturing method of a microfluidic device according to claim 1, wherein the second substrate is obtained by surface treatment to react the hydroxyl group of the second surface with a composite having a Si-vinyl group.

7. The manufacturing method of a microfluidic device according to claim 6,
wherein the second substrate is obtained by applying tetramethyldivinyldisilazane to the second surface and subsequently carrying out a surface treatment by heating at 100° C. to 250° C.

8. The manufacturing method of a microfluidic device according to claim 6,
wherein the second substrate is obtained by applying a silane coupling agent that contains an alkenyl group and an alkoxy group in one molecule to the second surface and subsequently carrying out a surface treatment by heating at 100° C. to 250° C.

9. A manufacturing method of a microfluidic device comprising the steps of:
preparing a first substrate which is made of silicone resin containing an unreacted part of a Si-vinyl group and a platinum catalyst after being cured and has a flat first surface in which a concave groove or a through hole is provided, and a second substrate which has a flat second surface in which a concave groove or a through hole is optionally provided and has a Si—H group on a flat face of the second surface; and
joining the first substrate and the second substrate by sticking the first surface of the first substrate and the second surface of the second substrate together.

10. The manufacturing method of a microfluidic device according to claim 9,
wherein the first substrate and the second substrate are heated in a state where the first surface of the first substrate and the second surface of the second substrate are stuck together.

11. The manufacturing method of a microfluidic device according to claim 9,
wherein the first substrate is obtained by thermally curing a silicone resin composite which contains:
(A)
organopolysiloxane which is made of one kind of copolymer including two or more kinds of units among below-listed "a" to "d" or a mixture of plural kinds of copolymer including two or more kinds of units among "a" to "d", has at least one alkenyl group in one molecule, and has viscosity of 100 mPa·s to 1,000,000 mPa·s,
a: $R^1SiO_{1.5}$ unit (here, $R^1$ denotes a C1-C10 straight-chain, branched or cyclic alkyl group or a C6-C10 aryl group),
b: $R^2SiO$ unit (here, $R^2$ denotes a C1-C10 straight-chain, branched or cyclic alkyl group or a C2-C8 alkenyl group),
c: $R^3SiO_{0.5}$ unit (here, $R^3$ is $R^1$ or $R^2$) and
d: $SiO_{2.0}$ unit;
(B)
organohydrogen polysiloxane which is made of copolymer of units represented by "a", "b", "d" and "e" below, has at least three Si—H groups in one molecule, and has viscosity of 5 mPa·s to 100 mPa·s,
a: $R^1SiO_{1.5}$ unit,
b: $R^2SiO$ unit,
d: $SiO_{2.0}$ unit and
e: $R^1_xH_ySiO_{(4-x-y)/2}$ unit (here, $R^1$ is as described above, x is 0, 1 or 2, y is 1 or 2, and x+y is 2 or 3); and
(C)
a platinum catalyst,
wherein the silicone resin composite contains an effective curing amount of H atoms bonded to Si atoms in the component (B) having a molar ratio of 0.2 to 1.0 with respect to a total of alkenyl groups in the component (A), and
the second substrate is obtained by: applying organohydrogen polysiloxane, which is made of copolymer including one kind of a unit among below-listed "b" and "e" or a mixture of plural kinds of copolymer including two kinds of the units of "b" and "e", has at least three Si—H groups in one molecule, and has viscosity of 5 mPa·s to 1,000 mPa·s, to the second surface; and subsequently performing heat treatment thereto at 100° C. to 200° C.,
b: $R^2SiO$ unit and
e: $R^1_xH_ySiO_{(4-x-y)/2}$ unit (here, $R^1$ is as described above, x is 0, 1 or 2, y is 1 or 2, and x+y is 2 or 3).

12. The manufacturing method of a microfluidic device according to claim 11,
wherein the second substrate is obtained by:
applying organohydrogen polysiloxane, which is made of copolymer of units represented by "d" and "e" below, has at least three Si—H groups in one molecule, and has viscosity of 5 mPa·s to 100 mPa·s, to the second surface; and subsequently performing heat treatment thereto at 100° C. to 200° C.,
d: $SiO_{2.0}$ unit and
e: $R^1_2HSiO_{0.5}$ unit (here, $R^1$ is as described above).

13. The manufacturing method of a microfluidic device according to claim 11,
wherein the second substrate is obtained by:
applying silane having an alkoxy group and a Si—H group in one molecule or cyclic siloxane to the second surface; and subsequently performing heat treatment thereto at 100° C. to 200° C.

14. A manufacturing method of a microfluidic device comprising the steps of:
preparing a first substrate made of silicone resin, which contains an unreacted part of a Si-vinyl group and a platinum catalyst after being cured and has a flat first surface in which a concave groove or a through hole is optionally provided, and a second substrate made of silicone resin, which contains an unreacted part of a Si—H group and a platinum catalyst after being cured and has a flat second surface in which a concave groove or a through hole is optionally provided; and
joining the first substrate and the second substrate by sticking the first surface of the first substrate and the second surface of the second substrate together.

* * * * *